(12) United States Patent
Poimboeuf et al.

(10) Patent No.: US 10,310,863 B1
(45) Date of Patent: Jun. 4, 2019

(54) PATCHING FUNCTIONS IN USE ON A RUNNING COMPUTER SYSTEM

(71) Applicant: Red Hat, Inc., Raleigh, NC (US)

(72) Inventors: Joshua Nathan Poimboeuf, Paducah, KY (US); Steven David Rostedt, Endwell, NY (US)

(73) Assignee: Red Hat, Inc., Raleigh, NC (US)

( * ) Notice: Subject to any disclaimer, the term of this patent is extended or adjusted under 35 U.S.C. 154(b) by 15 days.

(21) Appl. No.: 13/955,937

(22) Filed: Jul. 31, 2013

(51) Int. Cl.
*G06F 11/36* (2006.01)
*G06F 9/44* (2018.01)

(52) U.S. Cl.
CPC ............ *G06F 9/44* (2013.01); *G06F 11/3636* (2013.01); *G06F 11/3644* (2013.01)

(58) Field of Classification Search
CPC .......... G06F 8/65; G06F 8/67; G06F 11/3636; G06F 11/3644; G06F 11/3604; G06F 11/3612; G06F 11/3672; G06F 11/3676
USPC .................................. 717/168–173, 127–130
See application file for complete search history.

(56) References Cited

U.S. PATENT DOCUMENTS

| | | | | |
|---|---|---|---|---|
| 4,542,453 A * | 9/1985 | Patrick | ...................... | G06F 8/65 710/48 |
| 5,432,936 A * | 7/1995 | Gray | ...................... | G06F 8/434 712/E9.084 |
| 5,481,713 A * | 1/1996 | Wetmore | ................... | G06F 8/66 712/E9.083 |
| 5,564,031 A * | 10/1996 | Amerson | ................... | G06F 7/72 711/110 |
| 5,619,698 A | 5/1997 | Lillich et al. | | |
| 5,684,994 A * | 11/1997 | Tanaka | ..................... | G06F 8/443 717/153 |
| 5,896,538 A * | 4/1999 | Blandy | ............... | G06F 11/3409 714/E11.192 |
| 6,110,226 A * | 8/2000 | Bothner | ..................... | G06F 8/44 717/153 |
| 6,119,206 A * | 9/2000 | Tatkar | .................. | G06F 11/3612 702/101 |
| 6,189,141 B1 * | 2/2001 | Benitez | .................... | G06F 8/443 714/E11.209 |
| 6,202,208 B1 * | 3/2001 | Holiday, Jr. | ................... | 717/166 |
| 7,213,153 B2 | 5/2007 | Hollander et al. | | |
| 7,647,482 B2 * | 1/2010 | Hoflehner | ............... | G06F 8/441 712/220 |
| 7,657,695 B1 | 2/2010 | Wheeler | | |
| 7,784,044 B2 * | 8/2010 | Buban | ....................... | G06F 8/67 717/168 |
| 7,886,287 B1 | 2/2011 | Davda | | |
| 7,971,257 B2 * | 6/2011 | Repasi et al. | .................... | 726/24 |
| 8,091,077 B1 * | 1/2012 | Pliss | ................... | G06F 9/44505 717/140 |
| 8,261,247 B2 | 9/2012 | Arnold | | |

(Continued)

OTHER PUBLICATIONS

Bratus et al., "Katana: Towards Patching as a Runtime part of the Compiler-Linker-Loader Toolchain".

(Continued)

*Primary Examiner* — Jason D Mitchell
(74) *Attorney, Agent, or Firm* — Lowenstein Sandler LLP

(57) ABSTRACT

A mechanism for patching functions in use on a running computer system. A method includes modifying an original function to call a hot patch function. The hot patch function transfers execution control from the original function to a replacement function.

17 Claims, 4 Drawing Sheets

(56) References Cited

U.S. PATENT DOCUMENTS

| | | | |
|---|---|---|---|
| 8,448,022 B1* | 5/2013 | Scott | G06F 11/0715 714/16 |
| 8,468,516 B1* | 6/2013 | Chen et al. | 717/170 |
| 2003/0084434 A1* | 5/2003 | Ren | 717/172 |
| 2004/0025080 A1* | 2/2004 | Gardner | G06F 9/3865 714/25 |
| 2004/0025170 A1* | 2/2004 | Cao | G06F 9/4425 719/318 |
| 2004/0098707 A1* | 5/2004 | Tang | G06F 11/3624 717/130 |
| 2004/0107416 A1* | 6/2004 | Buban et al. | 717/170 |
| 2004/0210720 A1* | 10/2004 | Wong | G06F 8/60 711/132 |
| 2005/0132171 A1* | 6/2005 | Bharadwaj | G06F 8/445 712/217 |
| 2005/0183090 A1* | 8/2005 | Hunt | G06F 9/443 719/310 |
| 2005/0257208 A1* | 11/2005 | Blumfield et al. | 717/168 |
| 2006/0080654 A1* | 4/2006 | Shelton | 717/173 |
| 2006/0117316 A1* | 6/2006 | Cismas | G06F 9/3851 718/103 |
| 2006/0158354 A1* | 7/2006 | Aberg | G06F 8/447 341/50 |
| 2007/0083813 A1* | 4/2007 | Lui | G06F 11/3612 715/709 |
| 2007/0136719 A1* | 6/2007 | Lagergren | G06F 8/4441 717/140 |
| 2008/0148039 A1* | 6/2008 | Cobb | G06F 11/3612 713/100 |
| 2008/0222618 A1* | 9/2008 | Valtchev | G06F 9/4443 717/139 |
| 2008/0263533 A1* | 10/2008 | Huque et al. | 717/168 |
| 2008/0271001 A1* | 10/2008 | Nonomura | G06F 21/125 717/143 |
| 2009/0300427 A1* | 12/2009 | Schneider | G06F 11/3636 714/45 |
| 2009/0313611 A1* | 12/2009 | Panchamukhi et al. | 717/129 |
| 2009/0320129 A1* | 12/2009 | Pan | G06F 21/54 726/22 |
| 2010/0107149 A1* | 4/2010 | Hsu | G06F 9/328 717/168 |
| 2010/0205587 A1 | 8/2010 | Dai et al. | |
| 2011/0126179 A1 | 5/2011 | Hartman et al. | |
| 2012/0102476 A1 | 4/2012 | Yu et al. | |
| 2013/0117843 A1* | 5/2013 | Komaromy | G06F 21/52 726/22 |
| 2014/0173577 A1* | 6/2014 | Mitchell | G06F 8/67 717/168 |

OTHER PUBLICATIONS

Zandy et al., "Process Hijacking"—Section 5.
Tamches, "Fine-Grained Dynamic Instrumentation of Commodity Operating System Kernels"—Section 4.5.

\* cited by examiner

PATCHING FUNCTIONS IN USE ON A RUNNING COMPUTER SYSTEM

TECHNICAL FIELD

The implementations of the disclosure relate generally to a computer system and, more specifically, relate to patching functions that are in use on a running computer system.

BACKGROUND

Often there is a need to install patches, such as security patches or update patches as soon as possible on a running computer system. A patch is software designed to fix security problems or update a computer program including its supporting data. However, the patches to a kernel or applications in the system traditionally require rebooting the system before they take effect, which can be highly disruptive to users of the system. A reboot takes quite a long time and affects the availability of the system to users.

Currently, generic hot patching systems install patches by modifying a software code of a first instruction of an original function to jump into a replacement function to replace the original function. However, in such generic hot patching systems, the software code of the original function is modified every time a patch is installed or updated, which takes up a lot of time. As such, the generic hot patching systems provide a lack of flexibility, added complexity and further make it harder to ensure atomicity of the change in the original instruction.

BRIEF DESCRIPTION OF THE DRAWINGS

The disclosure is understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
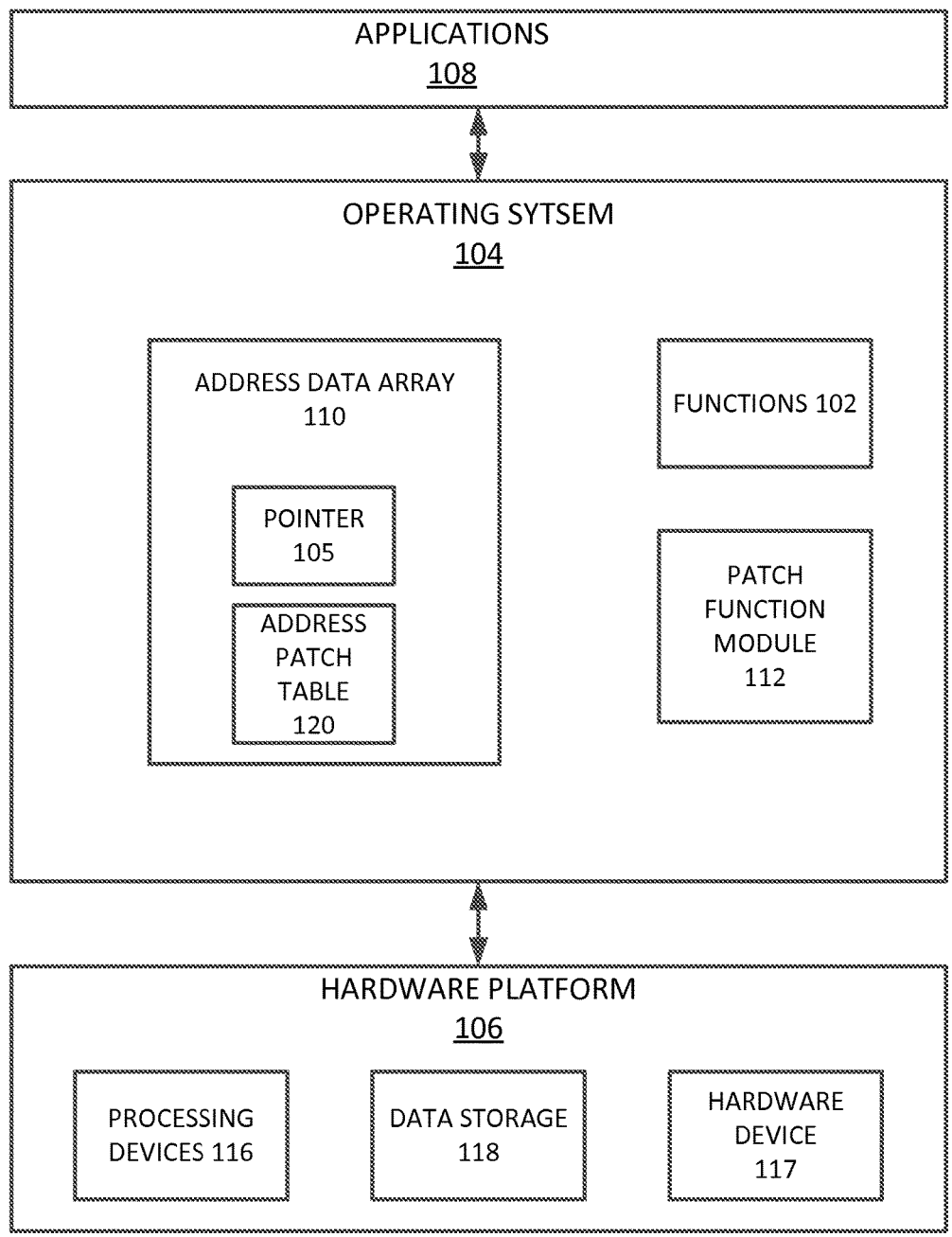
FIG. 1 is a block diagram of a computer system in which the implementations of the present disclosure may operate.

Implementations of the disclosure are directed to patching functions in use on a running computer system. The functions are patched to fix security problems or update a computer program including its supporting data. A method of one implementation of the disclosure includes modifying an original function to call the hot patch function. The hot patch function transfers execution control from the original function to a replacement function. The replacement function may include the function that replaces the original function. After execution of the replacement function, it returns to the caller of the original function.

Existing solutions for patching functions in use on a running computer system have several disadvantages. For example, the software code of the original function is modified every time there is a patch is installed or updated. Also, contents of an instruction associated with the modified software code should be stored in order to restore the original function if the patch is removed. This requires additional complexity. Also, in CPU architectures with variable length instruction sizes, modifying the software may require overwriting multiple instructions, which may prevent the change from being made atomically and could cause system instability. In addition, existing hot patching solutions are inflexible and may not be compatible with existing function tracing subsystems. Implementations of the disclosure overcome these disadvantages by modifying the original function such that one or more first instructions of the original function, which may include a no op instruction, are changed to be a call instruction to call the hot patch function and executing the first instruction when the original function is called to call into an hot patch function which transfers execution control to a replacement function which returns to the caller of the original function.

One of the advantages of the disclosure may include that the patching functions in use may be used either in kernel or in user space applications. Another advantage may include that it is compatible with trace function since it adds a hot patch function, which just may be another "tracer op", which may be tracing the original function. As such, other tracer ops can still trace the function's call time, backtrace, arguments, etc, even if the original function has been replaced with a replacement function. A further advantage of the hot patch function is that it may add a lot of flexibility and control to the patching process. The hot patch function may encapsulate the patch management functionality entirely within the hot patch function. For example, the hot patch function may only apply the patch conditionally based on some other setting, such as only replacing the original function once out of every 10 calls. Or, for example, it may even conditionally patch one replacement function from a list of several based on the value of some other variable. It may also allow for any number of changes to made to the hot patching mechanisms without having to modify the code of the original function any further.

FIG. 1 is a block diagram illustrating a computer system ("system") 100 in which implementations of the disclosure may operate. In one implementation, the computer system 100 may be a machine such as, for example, any variety of end user devices. The end user devices may include, but are not limited to, a personal computer (PC), a laptop, a mobile phone, mobile smart phone, a tablet computer, handheld devices, netbooks, or any other computing device. Furthermore, computer system 100 may comprise a server device. The computer system 100 comprises a hardware platform 106, on top of which runs an operating system (OS) 104. The OS 104 may include Microsoft™, Linux™, Solaris™, Mac™ OS or any other suitable OS for managing operations on the computer system 100.

The hardware platform 106 may include one or more processing devices 116 and data storage 118. In one implementation, the data storage 118 comprises one or more hardware or software devices, which may be located internally or externally to the computer system 100. Examples of data storage 118 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.). In addition, hardware platform 106 may include additional hardware devices 117, such as network interface cards (NICs), sound or video adaptors, photo/video cameras, printer devices, keyboards, displays or any other suitable device intended to be coupled to a computer system.

The OS 104 may utilize resources of hardware platform 106 to execute one or more software application programs 108 (i.e. applications). The applications 108 may be any computer-executable program capable of communicating with the OS 104. Some of these applications may include, but are not limited to, Microsoft™ applications, browser applications, an Eclipse integrated development environment (IDE), and/or other applications.

The OS 104 includes one or more functions 102. As discussed above, a function is a piece of software code executed on the OS 104. The OS 104 also includes an address data array (ADA) 110, which includes a plurality of addresses stored in an array for each of the original functions and the replacement functions. For each original function and its corresponding replacement function, the software code stores the relevant addresses in the ADA 110. In some implementations, the ADA 110 includes an address patch table 120 for storing the addresses in for each of the original addresses associated with the original functions and the replacement addresses associated with the replacement functions replacing the original functions. In some implementations, the ADA 110 provides a pointer 105 to an address associated with the function.

The OS 104 further includes a patch function module 112 to patch the function in a running system. As discussed above, a patch is software designed to fix security problems or update a computer program including its supporting data. In one implementation, the patch function module 112 identifies the original function to be patched. In one implementation, the patch function module 112 includes an array listing all original functions to patch and associated replacement functions. The original functions are the functions to be replaced with the associated replacement functions.

In one implementation, the patch function module 112 modifies the original function to transfer execution control from the original function to the replacement function. The original function may be currently loaded into memory of the operating system. The replacement function may include the function that replaces the original function. In one implementation, the original function is modified during run time of the operating system. The run time may be during the running of the operating system such that the operating system itself is modified while it is running.

In one implementation, the patch function module 112 may include information associated with the software code of the original function. Such information may include, but is not limited to, address, size and name of the original function. The patch function module 112 may also include a software code of the replacement function, and information associated with the software code of the replacement function. Such information may include address, size, and name of the replacement function, as well as relocation information about symbols for the replacement function. A symbol may include a global variable, which is used to name an address used by the function. For example, when, the patch function module 112 loads the replacement function into the memory, it reads a symbol table and relocates the symbol such that it converts the symbol name into an address and assigns it to the software code of the replacement function. In one implementation, the patch function module 112 may include an hot patch function and/or a hot patch hook function.

In one implementation, the patch function module 112 includes an hot patch function. In one implementation, the hot patch function may include a software code that transfers execution control to the replacement function. The transferring execution control may include setting up CPU registers and stack such that the replacement function executes with the same function arguments, CPU registers, and stack that the original function was called with. In one implementation, the transferring execution control may include storing the address of the replacement function in an Instruction Pointer (IP) register and executing a return instruction to return to the replacement function. In another implementation, the transferring may include executing a jump or a call instruction to the replacement function.

In one implementation, the hot patch function may include a software code having a combination of a trace function, to be called whenever the original function is called and a hot patch hook function. In one implementation, the trace function may be associated with the Linux ftrace subsystem. In one implementation, the trace function may store register values in a stack of memory. The register values may include the function arguments that had been provided to the original function by a caller of the original function. The register values may include an Instruction Pointer (IP) register value which may contain a return address within original function. The register values may also include a Stack Pointer (SP).

In another implementation, the trace function may store the CPU register values in the stack of memory. During execution of the hot patch function, some of the CPU register values may change. As such, the hot patch function may restore the register values to the original state such that when control is transferred to the replacement function, it sees the same register values and stack as seen by the original function. Thus, the replacement function will execute with the same function arguments.

In one implementation, the hot patch function may transfer the execution control from the original function to the replacement function. In one implementation, the patch function module 112 updates a first instruction of the original function. A first instruction of the original function may include a no-op instruction. A no-op instructions means that nothing is being executed in the original function. In some implementations, the patch function module 112 performs the update by changing first instruction to be a call instruction to call into the trace function of the hot patch function. In one implementation, the patch function module 112 executes the updated first instruction of the original function when the original function is called. As such, the updated first instruction of the original function may call into the trace function. The patch function module 112 may set the pointer 105 to point to the original address associated with the original function in the patch table 120.

In one implementation, the original function calls into the trace function of the hot patch function to store a set of register values in a stack of memory. The trace function may call into the hot patch hook function of the hot patch function to read the IP register value associated with an original address from the stack. In one implementation, the patch function module 112 moves the pointer 105 from the original address to the replacement address associated with the replacement function in the patch table 120. The patch function module 112 may read the IP register value associated with the replacement address. In one implementation, the patch function module 112 returns to the trace function to restore the register values from the stack. The patch function module may return to the replacement function. When the replacement function has completed executing, it may return to a caller of the original function.

Figure 2:
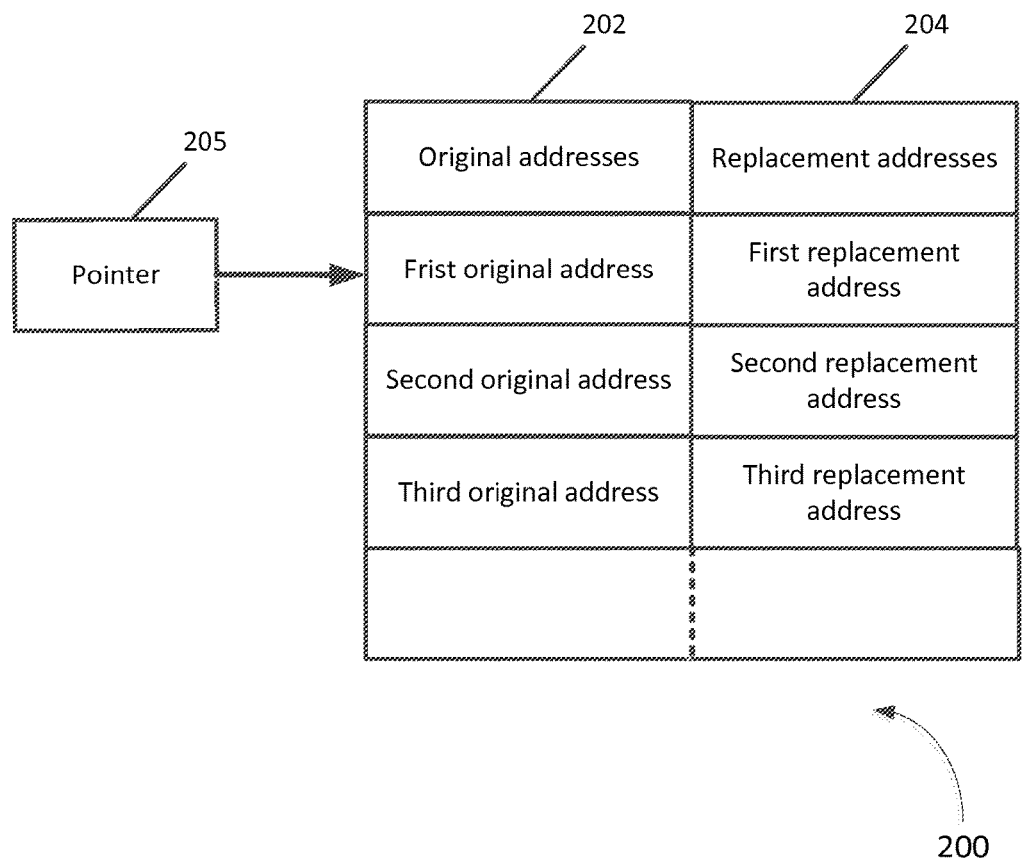
FIG. 2 illustrates an example of a table of address data array of a computer system in accordance with some implementations.

FIG. 2 illustrates an example of an address patch table 200 for storing a plurality of addresses for each of the functions in the ADA 110 of an operating system according to implementations of the disclosure. In one implementation, the address patch table 200 is the same as the address patch table 120 as depicted in the ADA 110 of FIG. 1. In some implementations, address patch table 200 includes original addresses 202 associated with the original functions and replacement addresses 204 associated with the replacement function, which replaces the original function. As shown, original addresses 202 include, but are not limited to, a first original address associated with a first original function a second original address associated with a second original function and a third original address associated with a third original function. Furthermore, the replacement addresses 204 include a first replacement address associated with the first replacement function, which replaces the first original function, a second replacement address associated with the second replacement function, which replaces the second original function, and a third replacement address associated with the third replacement function, which replaces the third original function.

In some implementations, a pointer 205 references an original address 202 of the original function. In one implementation, the pointer 205 is the same pointer 105 as depicted as part of the ADA 110 in FIG. 1. In some implementations, the pointer 205 is located on the stack. In other implementations the pointer 205 may be located in the IP register. In some implementations, the pointer 205 points to the address associated with the original function to be executed. As an example, the pointer 205 references a first original address of the original function to be executed.

Figure 3:
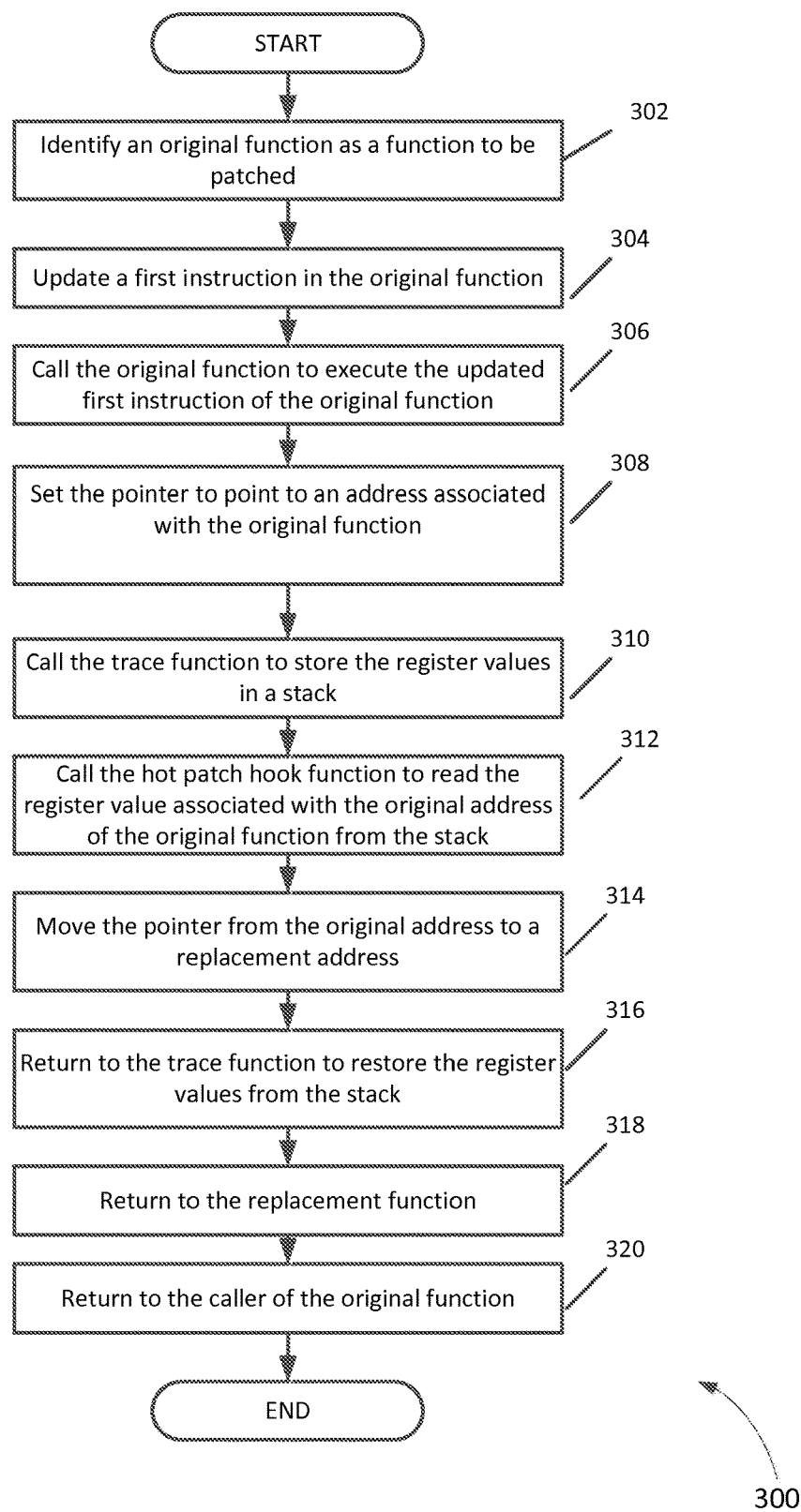
FIG. 3 is a flow diagram of an implementation of a method for patching functions in use on a running computer system.

FIG. 3 is a flow diagram of an implementation of a method for patching functions that are in use on a running computer system according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by the patch function module 112 of FIG. 1 executing in a computing device, such as the computer system 100 of FIG. 1.

Method begins at block 302, where an original function to be patched is identified by the patch function module 112. In one implementation, a first instruction of the original function is a no-op instruction. As discussed above, a no-op instruction means that nothing is being executed in the original function. As discussed above, the patch function module 112 includes a hot patch function. The hot patch function may include a software code having a combination of a trace function, to be called whenever the original function is called and a hot patch hook function. At block 304, the patch function module 112 updates the first instruction of the original function. In one implementation, the update includes changing the no-op instruction of the first instruction to be a call instruction to call into the trace function. At block 306, the patch function module 112 calls the original function to execute the updated first instruction of the original function. In one implementation, the first instructions calls into the trace function of the hot patch function.

At block 308, the patch function module 112 sets the pointer to point to an address associated with the original function in the table 120. At block 310, the hot patch function module 112 calls into the trace function to store the register values in the stack of the memory. At block 312, the patch function module 112 calls the hot patch hook function to read the IP register value associated with the original address of the original function from the stack. At block 314, the patch function module 112 moves the pointer from the original address to a replacement address in the table 120. At block 316, the hot patch function module 112 returns to the trace function to restore the register values from the stack of the memory. At block 318, the hot patch function module returns to the replacement function. At block 320, the replacement function returns to the caller of the original function.

Figure 4:
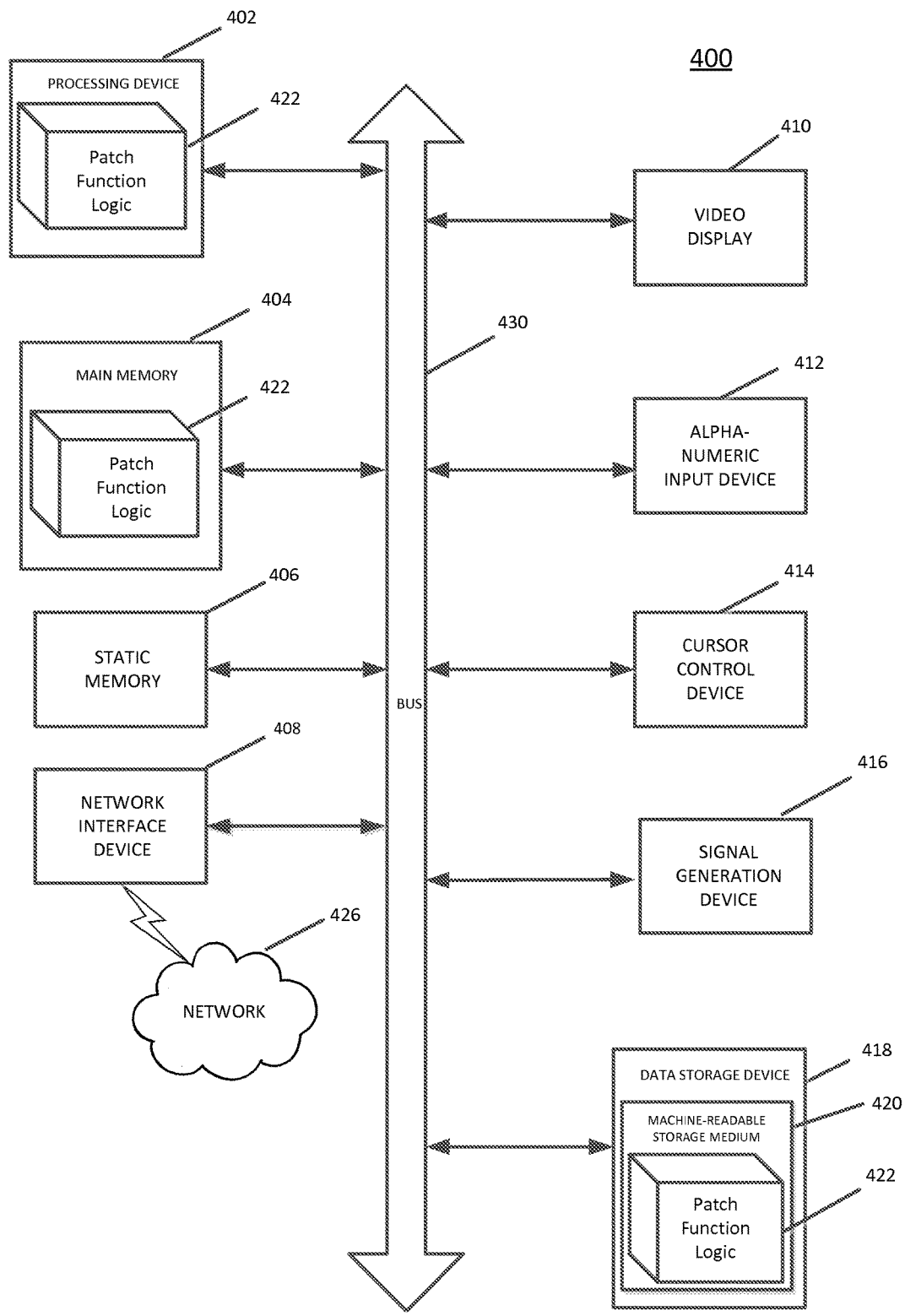
FIG. 4 illustrates a block diagram of one implementation of a computer system.

FIG. 4 illustrates a diagrammatic representation of a machine in the example form of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute patch function logic 422 for performing the operations and steps discussed herein. In one implementation, patch function module 112 described with respect to FIG. 1 performs the patch function logic 422.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium (or more specifically a computer-readable storage medium) 420 on which is stored one or more sets of instructions (e.g. patch function logic 422) embodying any one or more of the methodologies of functions described herein, such as method 200 for patching functions that are in use on a running computer system as described with respect to FIG. 2. The patch function logic 422 may also reside, completely or at least partially, within the memory 406 and/or within the processing device 402 during execution thereof by the computer system 400; the memory 406 and the processing device 402 also constituting machine-accessible storage media.

The machine-readable storage medium 420 may also be used to store the patch function processing logic 422 persistently containing methods that call the above applications. While the machine-readable storage medium 420 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It should be apparent, however, that the disclosure may be practiced without these specific details. In some instances, structures and devices are shown in block diagram form, rather than in detail, in order to avoid obscuring the disclosure.

Some portions of the detailed descriptions, which follow are presented in terms of algorithms and symbolic representations of operations on data bits within a computer memory. These algorithmic descriptions and representations are the means used by those well-known in the data processing arts to most effectively convey the substance of their work to others well-known in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating", "creating", "producing", "modifying", "altering", "transferring", "executing", "determining", "updating", "placing", "moving", "receiving", 'storing", "providing", "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

It is to be understood that the above description is intended to be illustrative, and not restrictive. Many other implementations will be apparent to those well-known in the art upon reading and understanding the above description. Although the disclosure has been described with reference to specific examples of implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
receiving a call to an original function;
modifying, by a processing device, the original function to call a hot patch function to transfer execution control from the original function to a replacement function by changing an initial instruction in the original function that specifies no operation to be executed to specifying that the call to the hot patch function is to be executed, wherein the hot patch function is conditionally applied to replace the original function in view of a number of calls to the original function that have been received by applying the hot patch function for a particular call for every defined number of calls that have been received and not applying the hot patch function for remaining calls for every defined number of calls that have been received;

changing, by the processing device, a value of a pointer, in a data structure identifying a plurality of original functions used by an operating system, from an original memory location associated with the original function to a replacement memory location associated with the replacement function;

executing, by the processing device, the replacement function using the pointer to the replacement memory location associated with the replacement function in the data structure identifying the plurality of original functions used by the operating system; and returning, by the processing device, to a caller of the original function in response to executing the replacement function.

2. The method of claim 1 wherein the hot patch function is associated with a security update for the original function.

3. The method of claim 1, further comprising:
in response to executing the replacement function, changing a value of a register of the processing device to reflect another value of the original function, wherein the executing of the replacement function uses the another value of the original function.

4. The method of claim 3 further comprising calling the original function to execute the changed first instruction of the original function.

5. The method of claim 1, wherein the transferring execution control comprises returning from the hot patch function to the replacement function.

6. The method of claim 1 wherein the original function is modified during run time of the operating system.

7. A system comprising:
a memory;
a processing device, operatively coupled with the memory, to:
receive a call to an original function;
modify the original function to call a hot patch function to transfer execution control from the original function to a replacement function by changing an initial instruction in the original function that specifies no operation to be executed to specifying that the call to the hot patch function is to be executed, wherein the hot patch function is conditionally applied to replace the original function in view of a number of calls to the original function that have been received by applying the hot patch function for a particular call for every defined number of calls that have been received and not applying the hot patch function for remaining calls for every defined number of calls that have been received;
change a value of a pointer, in a data structure identifying a plurality of original functions used by an operating system, from an original memory location associated with the original function to a replacement memory location associated with the replacement function;
execute the replacement function using the pointer to the replacement memory location associated with the replacement function in the data structure identifying the plurality of original functions used by the operating system; and
return to a caller of the original function in response to executing the replacement function.

8. The system of claim 7, wherein the hot patch function is associated with a security update for the original function.

9. The system of claim 7, wherein the processing device is further to:
in response to executing the replacement function, change a value of a register of the processing device to reflect another value of the original function, wherein the executing of the replacement function uses the another value of the original function.

10. The system of claim 9, the processing device to call the original function to execute the changed first instruction of the original function.

11. The system of claim 7, wherein to transfer execution control, the processing device is to return from the hot patch function to the replacement function.

12. The system of claim 7, wherein the original function is modified during run time of the operating system.

13. A non-transitory machine-readable storage medium comprising data, when accessed by a processing device, cause the processing device to:
receive a call to an original function;
modify, by the processing device, the original function to call a hot patch function to transfer execution control from the original function to a replacement function by changing an initial instruction in the original function that specifies no operation to be executed to specifying that the call to the hot patch function is to be executed, wherein the hot patch function is conditionally applied to replace the original function in view of a number of calls to the original function that have been received by applying the hot patch function for a particular call for every defined number of calls that have been received and not applying the hot patch function for remaining calls for every defined number of calls that have been received;
change, by the processing device, a value of a pointer, in a data structure identifying a plurality of original functions used by an operating system, from an original memory location associated with the original function to a replacement memory location associated with the replacement function;
execute, by the processing device, the replacement function using the pointer to the replacement memory location associated with the replacement function in the data structure identifying the plurality of original functions used by the operating system; and
return, by the processing device, to a caller of the original function in response to executing the replacement function.

14. The non-transitory machine-readable storage medium of claim 13, wherein the hot patch function is associated with a security update for the original function.

15. The non-transitory machine-readable storage medium of claim 13, wherein the processing device is further to:
in response to executing the replacement function, change a value of a register of the processing device to reflect another value of the original function, wherein the executing of the replacement function uses the another value of the original function.

16. The non-transitory machine-readable storage medium of claim 13, wherein the processing device is to call the original function to execute the changed first instruction of the original function.

17. The non-transitory machine-readable storage medium of claim 14 wherein the first instruction is a no-op instruction.

* * * * *